United States Patent
Wardle et al.

(10) Patent No.: US 10,652,686 B2
(45) Date of Patent: May 12, 2020

(54) METHOD OF IMPROVING LOCALIZATION OF SURROUND SOUND

(71) Applicant: Sony Interactive Entertainment Inc, Tokyo (JP)

(72) Inventors: Scott Wardle, Foster City, CA (US); Joshua Isenberg, Fremont, CA (US); Robert Pullman, III, San Jose, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/890,072

(22) Filed: Feb. 6, 2018

(65) Prior Publication Data
US 2019/0246231 A1 Aug. 8, 2019

(51) Int. Cl.
*H04S 7/00* (2006.01)
*G06K 9/00* (2006.01)

(52) U.S. Cl.
CPC .......... *H04S 7/303* (2013.01); *G06K 9/00624* (2013.01); *H04S 7/304* (2013.01); *H04S 2400/11* (2013.01); *H04S 2420/01* (2013.01)

(58) Field of Classification Search
CPC .. H04S 7/303; H04S 2400/11; H04S 2420/01; G06K 9/00624
USPC ..................... 381/56, 58, 124, 303
See application file for complete search history.

(56) References Cited

U.S. PATENT DOCUMENTS

| | | | |
|---|---|---|---|
| 9,955,281 B1* | 4/2018 | Lyren | H04S 7/304 |
| 2006/0045294 A1* | 3/2006 | Smyth | H04S 7/304 |
| | | | 381/309 |
| 2012/0020485 A1* | 1/2012 | Visser | H04R 3/005 |
| | | | 381/57 |
| 2012/0213375 A1 | 8/2012 | Mahabub et al. | |
| 2014/0270245 A1 | 9/2014 | Elko et al. | |
| 2014/0355794 A1 | 12/2014 | Morrell et al. | |
| 2015/0170657 A1 | 6/2015 | Thompson et al. | |
| 2016/0302005 A1 | 10/2016 | Fedosov et al. | |
| 2017/0105083 A1* | 4/2017 | Nair | H04S 7/30 |
| 2017/0223478 A1* | 8/2017 | Jot | G10L 19/20 |

(Continued)

FOREIGN PATENT DOCUMENTS

| | | |
|---|---|---|
| WO | 2017125821 A1 | 7/2017 |
| WO | 2018026963 A1 | 2/2018 |
| WO | 2018060550 A1 | 4/2018 |

OTHER PUBLICATIONS

International Search Report and Written Opinion for International Patent Application PCT/US2019/0160164 dated Feb. 28, 2019.

*Primary Examiner* — William A Jerez Lora
(74) *Attorney, Agent, or Firm* — JDI Patent; Joshua D. Isenberg; Robert Pullman

(57) ABSTRACT

Aspects of the present disclosure relate to a method and system for processing an audio signal to optimize the localization of sound in a sound system using a head related transfer function HRTF). A location of a user is determined and a speaker is driven with a waveform representing a location specific cue having a desired user response. The location specific cue is associated with a defined HRTF for the determined location of the user. A user response to location specific cue is detected and compared to the location specific cue. The defined HRTF is then updated with information from the comparison of the user response to the location specific cue.

18 Claims, 13 Drawing Sheets

(56) References Cited

U.S. PATENT DOCUMENTS

| | | |
|---|---|---|
| 2017/0366912 A1 | 12/2017 | Stein et al. |
| 2018/0249274 A1* | 8/2018 | Lyren .................... H04S 7/303 |
| 2018/0373957 A1* | 12/2018 | Lee ........................ H04S 7/302 |

* cited by examiner

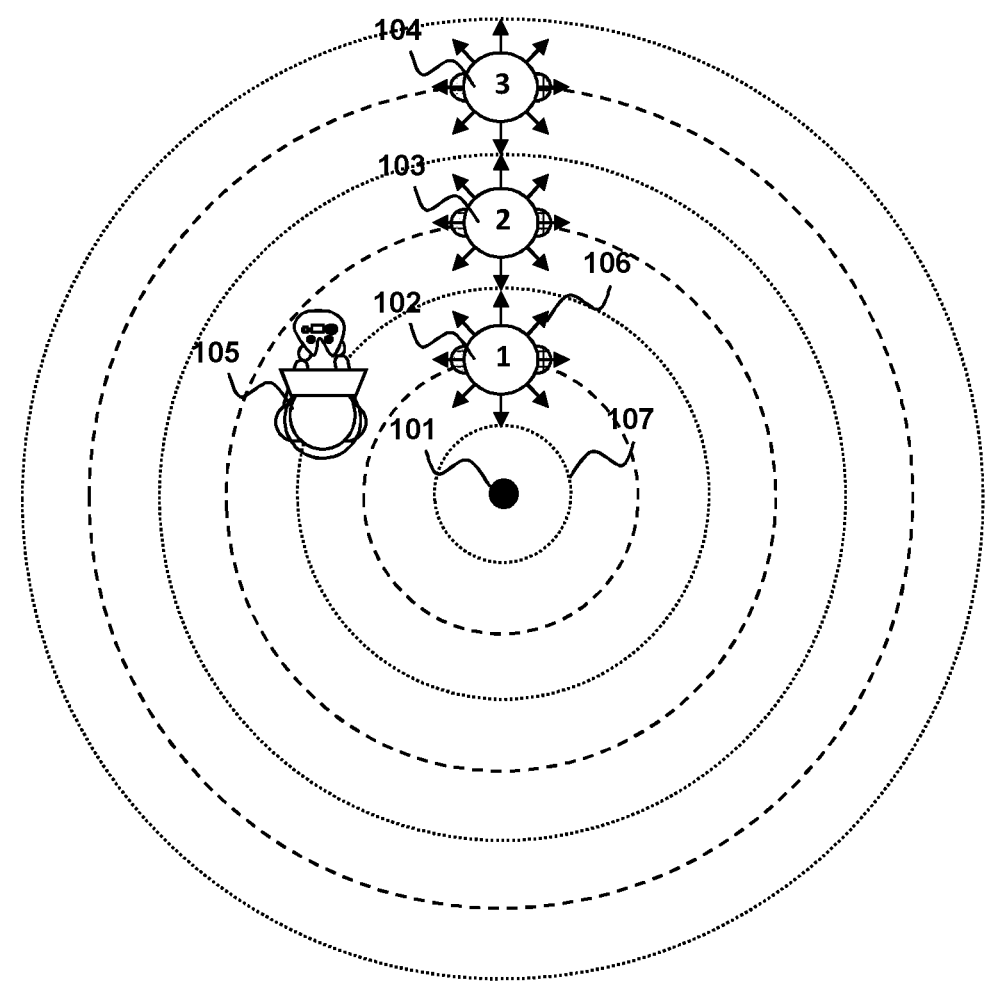
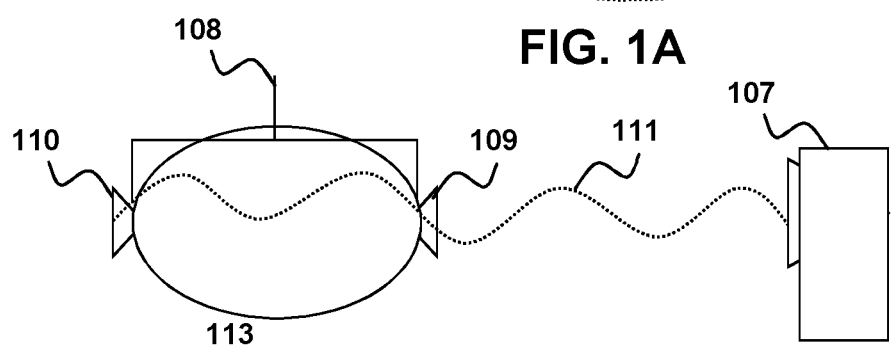
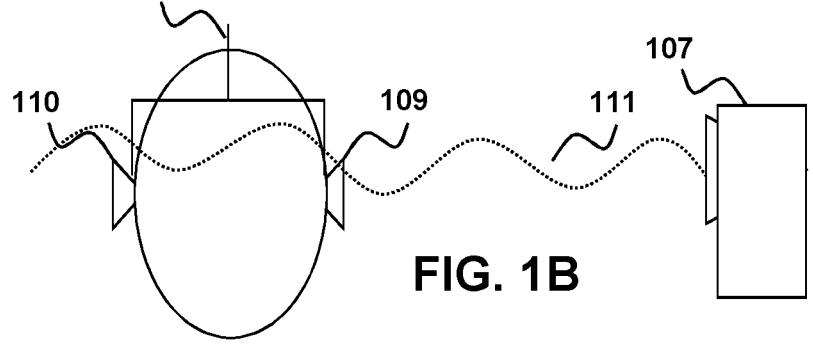
FIG. 1A
FIG. 1B

METHOD OF IMPROVING LOCALIZATION OF SURROUND SOUND

FIELD

The present disclosure relates to audio signal processing and sound localization. In particular, aspects of the present disclosure relate to optimization of the localization and externalization of sound in a surround sound type speaker system.

BACKGROUND

Human beings are capable of recognizing the source location, i.e. distance and orientation, of sounds heard through the ears through a variety of auditory cues related to head and ear geometry, as well as the way sounds are processed in the brain. Surround sound systems attempt to enrich the audio experience for listeners by outputting sounds from various locations which surround the listener.

Typical surround sound systems utilize an audio signal having multiple discrete channels that are routed to a plurality of speakers, which may be arranged in a variety of known formats. For example, 5.1 surround sound utilizes five full range channels and one low frequency effects (LFE) channel (indicated by the numerals before and after the decimal point, respectively). For 5.1 surround sound, the five full range channels would then typically be arranged in a room with three of the full range channels arranged in front of the listener (in left, center, and right positions) and with the remaining two full range channels arranged behind the listener (in left and right positions). The LFE channel is typically output to one or more subwoofers (or sometimes routed to one or more of the other loudspeakers capable of handling the low frequency signal instead of dedicated subwoofers). A variety of other surround sound formats exist, such as 6.1, 7.1, 10.2, all of which generally rely on the output of multiple discrete audio channels to a plurality of speakers arranged in a spread out configuration. The multiple discrete audio channels may be coded into the source signal with one-to-one mapping to output channels (e.g. speakers). Alternatively, the channels may be extracted from a source signal having fewer channels, such as a stereo signal with two discrete channels, using other techniques like matrix decoding to extract the channels of the signal to be played.

Surround sound systems have become popular over the years in movie theaters, home theaters, and other system setups, as many movies, television shows, video games, music, and other forms of entertainment take advantage of the sound field created by a surround sound system to provide an enhanced audio experience. However, there are several drawbacks with traditional surround sound systems, particularly in home theater applications. For example, creating an ideal surround sound field typically depends on optimizing the physical setup of the speakers. Unfortunately, physical constraints and other limitations may prevent optimal speaker setup. Furthermore, there is generally no standard for speaker height in many surround sound formats. Moreover, a surround sound system may not be able to simulate the three-dimensional nature of a sound field with the same degree of accuracy as a headphone based system.

Systems have been proposed that manipulate an underlying sound source signal so that it sounds as if it originated from a desired location when played over headphones. This technique is often referred to in audio signal processing as "sound localization." Many known audio signal processing techniques attempt to implement sound localization using a time domain Head Related Impulse Response (HRIR) function or its Fourier transform, known as a Head Related Transfer Function (HRTF). An HRTF characterizes how sound from a particular location is modified by the anatomy of the human head before it enters a listener's ear canal. Sound localization typically involves convolving the source signal with a HRTF for each ear for the desired source location. The HRTF is often derived from a binaural recording of an acoustic impulse in an anechoic chamber. The impulse source is positioned at a desired location relative to an actual or dummy human head having microphones placed inside each ear canal, to record how the head affects an impulse originating from that location before reaching the transducing components of the ear canal.

The HRTF may be represented by a set of attenuation values for corresponding frequency bins. The HRTF for a given location may be determined by recording a known broadband sound signal at the location without the dummy head and then recording the same signal at the location with the dummy head in place. Both recorded signals may then be converted to frequency domain spectra (e.g., by fast Fourier Transform). Dividing each attenuation value for each frequency bin in the spectrum obtained with the head by the corresponding attenuation value in the spectrum obtained without the head yields the HRTF for that location.

Virtual surround sound systems involving headphone playback may also to take into account environmental acoustic effects in order to create a surround sound signal that sounds as if it were naturally occurring in the listener's acoustic environment as opposed to being played directly at the ears or in an anechoic chamber with no environmental reflections and reverberations of the sounds. Accordingly, many known audio signal processing techniques also model the impulse response of the environment, hereinafter referred to as the "room impulse response" (RIR), using synthesized room impulse response function that is algorithmically generated to model the desired environment. These room impulse response functions are also convolved with the source signal in order to simulate the acoustic environment. In a surround sound type system these room impulse responses may generate unwanted effects such as echoes and reverberations. Such unwanted effects may change the user's perception of the location of a sound source and decrease the fidelity of the sound within the room.

Unfortunately, existing sound systems using the aforementioned techniques to modify acoustic signals still suffer from poor performance, and do not accurately localize sound or counteract unwanted room effects.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIG. 1A is a schematic diagram of a person in a room with a point sound source and multiple simulated HRTF's at different points within the room.

FIG. 1B is a schematic diagram of different head shapes listening to sound originating from a speaker.

DETAILED DESCRIPTION

Figure 2:
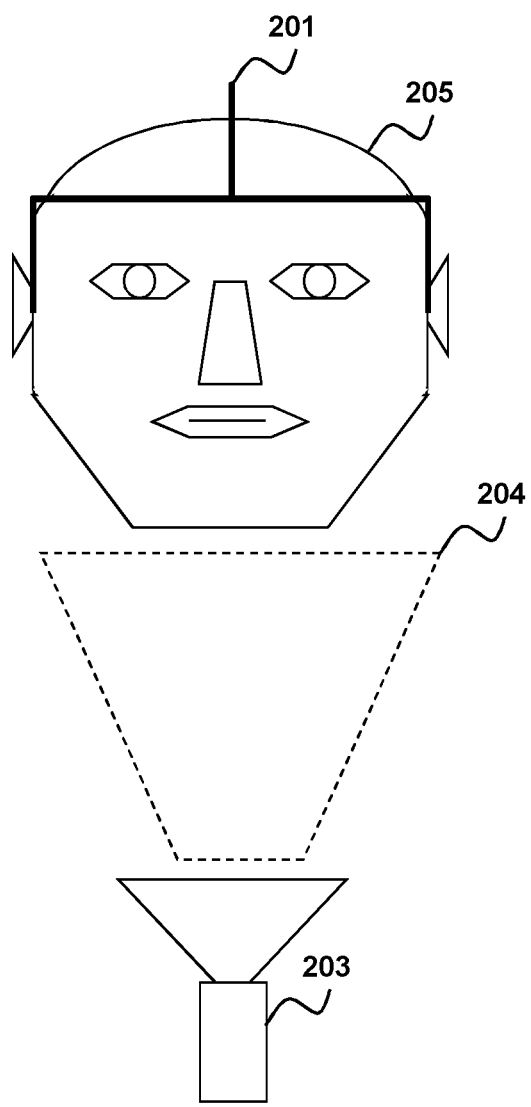
FIG. 2 is a schematic diagram depicting a human head being captured by an image capture device and measuring the inter-aural distance according to aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Aspects of the present disclosure relate to optimization and refinement of the Head Related Transfer Function (HRTF) for an individual listener for better sound localization and externalization. The HRTF describes the effect of a listener's head on the frequency and phase of sounds that reach the listener's ears. Each listener has a different HRTF because at least a portion of the HRTF depends on anatomical traits that vary from listener to listener. The human brain is highly adaptable and can gain information about the location of a sound source using these unique anatomical traits.

One such anatomical trait that affects the HRTF is head size. A person with a larger head may have a greater inter-aural phase difference or inter-aural time delay (ITD) than a person with a smaller head. Similarly the person with a larger head may have a greater frequency dampening effect between their ears. Other anatomical traits that affect an individual listener's HRTF include the size of the outward protrusion of the ear called an Auricle or Pinna. Because anatomical traits vary can have a significant effect and can vary among users a single HRTF solution generalized for use with every user is not optimal.

Additionally within the context of a loudspeaker sound system the HRTF for an individual depends on the distance and direction to a source of sound. As such an array of different HRTF's may be created for an individual corresponding to different distances and directions from a sound source. Each such HRTF may also take into account the physical characteristics of that individual, such as inter-aural distance and pinna size. From this array of HRTFs the closest approximation the individual's HRTF for a given location relative to each source of sound (e.g., each loudspeaker) may be chosen to optimize sound localization.

These and further aspects of the present disclosure will be apparent upon consideration of the following detailed description of various implementation details and their accompanying drawings.

Implementation Details

FIG. 1A depicts an example of a set-up for recording HRTF's. A known sound is emitted from a point sound source 101 in an echo-free room with multiple HRTF recording devices 102, 103, 104 stationed at various fixed distances from the point source 101. Each of HRTF recording device may comprise a dummy head made of a material chosen to simulate the density and resonance of the human head and two microphones located on either side of the dummy head. At each distance, the sound wave may be detected with the HRTF recording device in different orientations 106. This ensures that an HRTF will be available for a range of possible distances and orientations of a user 105 with respect to the sound source 101. For a point sound source, the sound waves 107 may be treated as spherical wavefronts. The HRTF recording devices may therefore be placed at fixed distance.

To approximate the HRTF for a person 105 located between locations corresponding to two recorded HRTF's one may interpolate between the two recorded HRTF's. By way of Example and not by way of limitation the HRTF of a person located between recording device 102 and recording device 103 may be generated by interpolating between the HRTF 1 generated for position 102 HRTF 2 generated for position 103.

From the HRTF's obtained for various distances and angles a function may be developed that describes how the attenuation value for each frequency bin of an HRTF for a person varies over ranges of distances and angles. Such a function may additionally take into account variations in the relative height of the sound source. Interpolating between measured HRTF's obtained at two known locations and/or orientations is a relatively straightforward matter of applying the function to intermediate location and/or orientation values.

The HRTF for an individual also depends on the individual's head shape. FIG. 1B illustrates the effect of head shape on HRTF. In the illustrated example, sound 111 travels from a source on the right side of the listener 107, first reaching the listener's right ear 109 and then the left ear 110. The sound wave 111 enters the left ear 110 at a different phase than at the right ear 109. Additionally there are effects on the frequency and intensity of the sound due to the skull and brain of the listener between the two ears. These "inter-aural effects" add additional information that the user's brain may use to determine that location of a sound. A person with a larger head may have a larger phase shift between the sounds received at their ears. Additionally there may also be a greater muffling or dampening of high frequencies of the sound at ears located on the opposite side of the listener's head.

These inter-aural effects may be unique to the listener with each listener having their hearing system trained to determine the location of sounds based on their own physiological characteristics. A person with a wider head 108 will have a longer inter-aural distance than a person with a smaller head 113. As a result the phase difference between the waves entering the right ear 109 and the waves entering the left ear 110 will be smaller in the person with the smaller head 113. As such filtering for an HRTF using one size dummy head cannot completely recreate with high fidelity sound locations as the would be perceived by the listener in a real environment. To simulate these differences HRTF's may be generated using dummy heads that have different inter-aural distances corresponding to different human head sizes.

Simply generating HRTFs using HRTF recording devices with different inter-aural distances does not inform the system of the user's unique physiology. Thus it would be desirable to create a system which determines the user's head shape and generate an HRTF for the user which compensates for the effect of the listener's head. FIG. 2 depicts an embodiment of the present disclosure that generates an HRTF which compensates for the user's head shape. An image capture unit 203 such as photographic or video camera may be used to take an image 204 of the user's head 205. The image of the user's head may be analyzed to determine the inter-aural distance 201 using known image analysis methods. Additional depth information may come from the stereo camera, a light source coupled to controller or various other range finding systems such as ultrasonic or infrared range detectors (not shown). In an alternative embodiment the system may simply prompt the user to measure their inter-aural distance 201 and provide that information to the system. In another exemplary embodiment the system may provide the user with various different images of heads and ears having different sizes and shapes which are each tied to a different HRTF set. The user may select the head and/or ear type closest to the user's own head and/or ear type based on the image selection the system may use the HRTF set tied to the selected image for the user. In a related embodiment the system may further narrow the user's HRTF after selection by performing image analysis on an image of the user's head as discussed above. In another alternative embodiment the inter-aural distance may be identified from a picture provided to the system by the user.

The system may compensate for the shape of the user's head in the generation of the HRTFs. This may be done in a similar manner as with the distance shown in FIG. 1. As discussed above multiple HRTF's may be generated with different sized dummy heads chosen to simulate the different sizes of human head. From the different HRTF recordings with dummy head sizes it may be determined which components of the HRTF are related to head size/density. For listeners with intermediate head sizes one may interpolate between the HRTF to better fit the function to listener, otherwise the next larger size may be used.

Figure 3A:
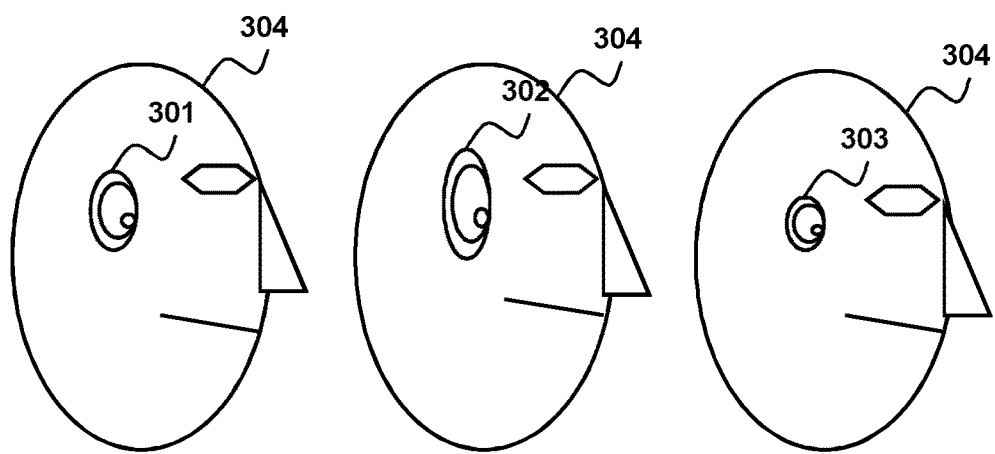
FIG. 3A is a schematic diagram depicting HRTF recording dummy heads with different Pinna sizes according to aspects of the present disclosure.

Another factor affecting the HRTF is the physiognomy of the subject's ear. In particular, the external part of the ear, known as the Pinna or Auricle, has a large effect on the localization of sound. The Pinna plays an especially large role in the determination of the height of a sound source. Thus as shown in FIG. 3A dummy heads 304 having different sized and/or shaped pinna 301, 302, 303 may be used to generate HRTF filters that better accommodate localization of sounds for varying pinna sizes of listeners. Different components of a person's ears have different effects on the perceived sound frequencies. Portions of the ear act like a notch filter which reduces the amplitude of sounds of at selected frequencies. For example a person with smaller ears will experience filtering for sounds at higher frequencies than someone with larger ears. It has been discovered that the proportions of the ear has a direct correlation to the filtering effects.

Figure 3B:
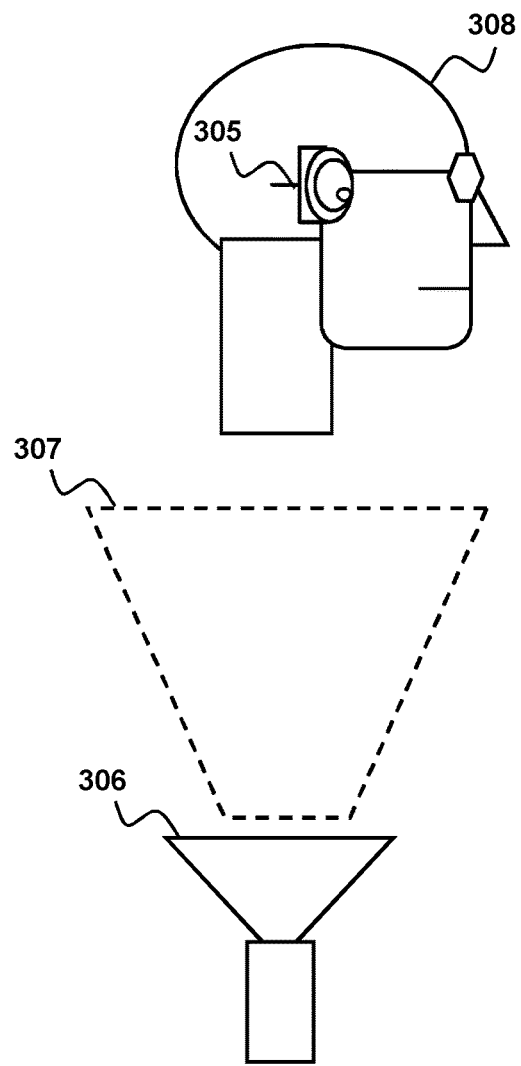
FIG. 3B is a schematic diagram of a side of a human head being captured by an image capture device to determine ear size and shape according to aspects of the present disclosure.

An image capture unit 306 may be used to identify the size of the listener's pinna. The image capture unit may be configured to identify the ear 305 of the listener 308 when the listener's head turns to face the image capture unit. As seen in FIG. 3B. Similar to the determination of inter-aural distance, depth information may come from a light-source coupled to a controller held by the listener or various other range finding systems such as ultrasonic or infrared range detectors. Once the listener's ear has been identified within an image the image may be analyzed using known methods to determine aspects of the user's ear such as ear size 305. In an alternative embodiment the system may simply prompt the user to measure the size of their pinna and provide that information to the system. In another alternative embodiment listener pinna size and/or shape may be identified from a picture provided by the system or to the system by the user.

In some implementations, a function relating the effect of pinna size on HRTF components may be determined empirically if sufficient HRTF data are available for different listeners with different measured pinna configurations. Such a function may be used to interpolate between two measured HRTF's to generate an HRTF that better fits the anatomy of the user. In other implementations if a listener's pinna size falls between two pinna sizes for which HRTF's have been measured it may be sufficient to use the measured HRTF corresponding to the larger pinna of the two pinna sizes.

Figure 10:
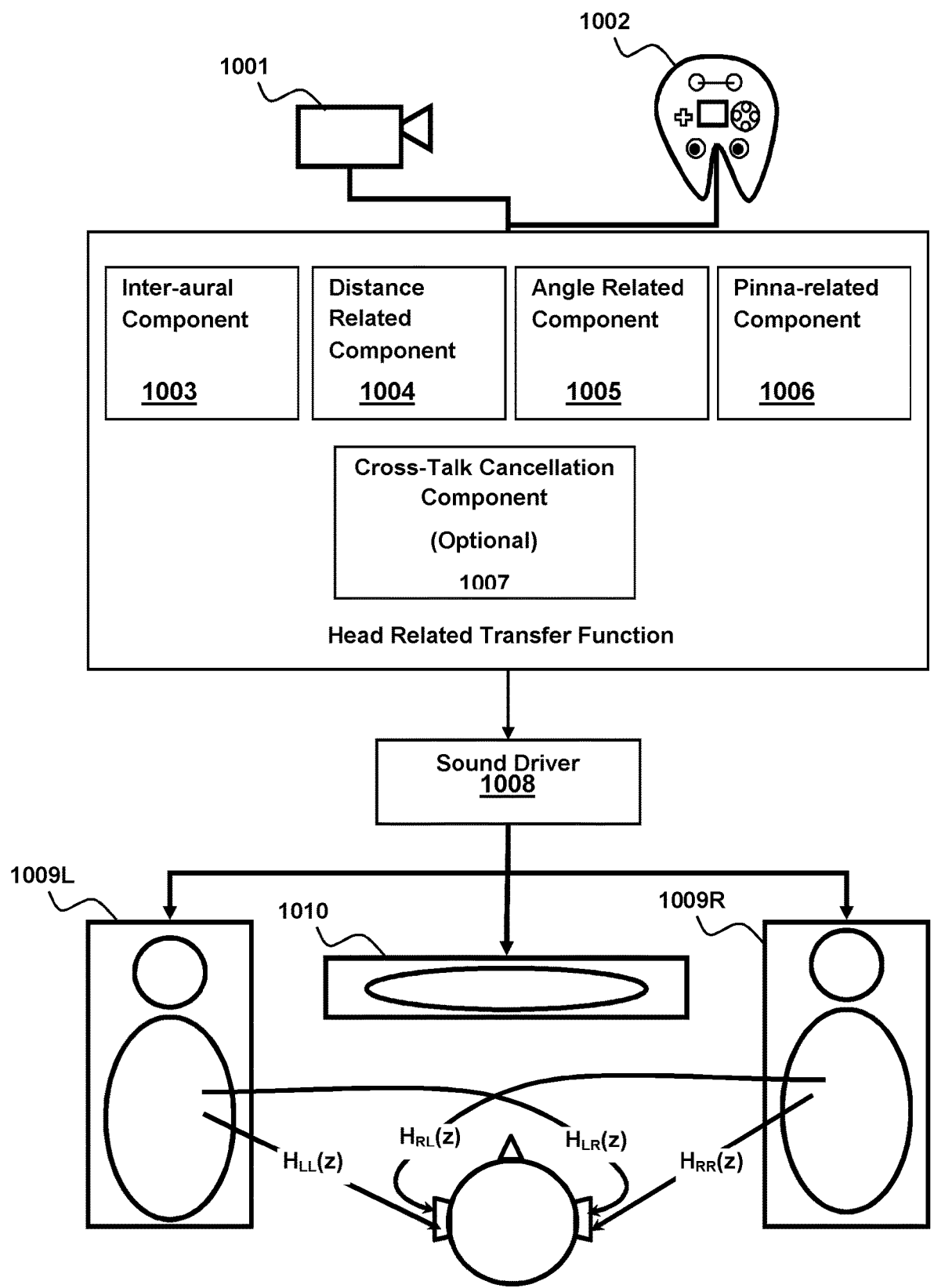
FIG. 10 is a representational diagram of the development of an HRTF filter function using, Inter-aural distance, D

As seen in FIG. 10 it may be desirable to combine the effects of different variables (distance, orientation, head-size, pinna size/shape) when generating HRTFs. By way of example and not by way of limitation, arbitrary HRTF's may be generated from measured HRTF data using a function having an inter-aural distance component 1003, a source distance component 1004, an orientation component 1005, and a pinna size component 1006, source height or any combination thereof. An array of different measured HRTF's could be stored within the system and chosen based on the attributes of the user. Ultimately in some embodiments the goal would be to create an adequate function that describes how different variables such as distance to source, angle to source, height of source, and head shape affect the HRTF. From that function and HRTF set would be generated that will account for the various variables during sound playback and localization. Further aspects of HRTF generation are described in co-pending application Ser. No. 15/890,031, filed Feb. 6, 2018 entitled "VIRTUAL LOCALIZATION OF SOUND" (Attorney Docket Number SCEA17069US00, the entire contents of which are incorporated herein by reference). Once this HRTF set has been determined user feedback may be used to create or select the optimum HRTF from the set according to additional aspects of the present disclosure. An adequate HRTF set describes the effects of the various sources at different locations and for slightly different sets of head types the system may use the image capture unit 1001 and motion detecting controller to further refine the HRTF set to a single HRTF for the user. The HRTF will then be convolved with a source audio signal at a sound driver 1007. This may involve converting a time-domain audio signal to the frequency domain by performing a Fourier transform on the audio signal and multiplying the resulting transformed audio signal by the HRTF. Subsequently the convolved audio signal may be converted back into the time domain and used to drive one or more speakers 1008, 1009L, 1009R, for example a pair of headphones. In implementations involving loudspeakers the signal from the sound driver may be further modified by a cross-talk cancellation function 1010.

Cross-talk cancellation may be done using pairs of loudspeakers that are not part of a set of headphones. In mathematical terms, cross-talk cancellation involves inverting a 2×2 matrix of transfer functions, where each element of the matrix represents a filter model for sound propagating from one of the two speakers to one of the two ears of the listener. As seen in FIG. 10, the transfer function for the user's left ear includes a transfer function $H_{LL}(z)$ for sound from the left speaker 1009L and a cross-talk transfer function $H_{RL}(z)$ for sound from the right speaker 1009R. Similarly, the transfer function for the user's right ear includes a transfer function $H_{RR}(z)$ for sound from the right speaker 1009R and cross-talk transfer function $H_{LR}(z)$ for sound from the left speaker 1009L.

The matrix inversion may be simplified if it can be assumed that the left ear and right ear transfer functions are perfectly symmetric in which case $H_{LL}(z)=H_{RR}(z)=H_S(z)$ and $H_{RL}(z)=H_{LR}(z)=H_O(z)$. In such situations, the matrix inversion becomes:

$$\begin{bmatrix} H_{LL}(z) & H_{LR}(z) \\ H_{RL}(z) & H_{RR}(z) \end{bmatrix}^{-1} \approx \begin{bmatrix} H_S(z) & H_O(z) \\ H_O(z) & H_S(z) \end{bmatrix}^{-1} = \frac{1}{H_S^2(z) - H_O^2(z)} \begin{bmatrix} H_S(z) & H_O(z) \\ H_O(z) & H_S(z) \end{bmatrix}$$

The main constraint in such situations is that $$\frac{1}{H_S^2(z) - H_O^2(z)}$$

must be stable. In many cases this may be physically realizable.

To determine the transfer functions and perform the matrix inversion one would need to know the position of each of the listener's ears (distance and direction). The cross-talk cancellation filters could be computed after the appropriate HRTF's are measured, and stored for later use. The same filters measured to capture the HRTF are the ones which would be used to compute the cross-talk cancellation filters.

The cross-talk cancellation filtering may after the HRTF convolution of the driving signal with the HRTF and just before playback over a pair of loudspeakers 1009L, 1009R. There would need to be some means of selecting which pair of speakers out of all the available ones to use if crosstalk cancellation cannot be done using more than two loudspeakers.

Feedback Driven HRTF Optimization

According to aspects of the present disclosure as discussed above the system may be able to detect physical attributes of the listener which effect the sound localization and narrow down the HRTF for the user to a set of HRTFs. Further enhancement to the listener's experience may be gained through user feedback. This feedback may come from an initial set-up period for the system or may be a continuous improvement process running throughout the user's interactions with the system. In some implementations the feedback process may be disguised as part of a game or may be integrated in to the game itself.

Figure 7A:
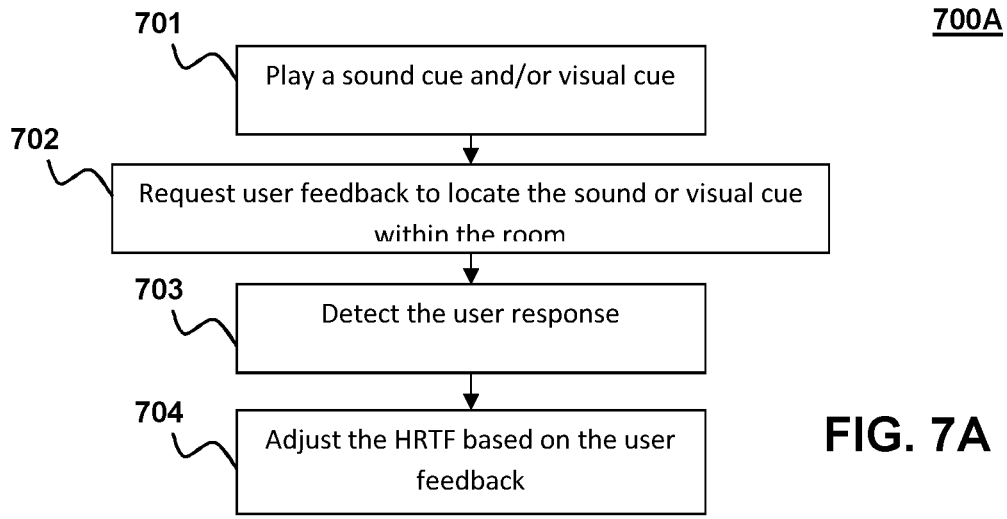
FIG. 7A is a flow diagram depicting a general method for refinement of the Head Related Transfer Function used in a room according to aspects of the present disclosure.

By way of example and not by way of limitation, a feedback driven HRTF filter optimization process follows the general method shown in FIG. 7. A sound cue or visual cue is provided to the user 701. The system will prompt the user with a request to take some action in relation to the sound or visual cue 702. The request may be before, after or during the cue. The request will have a specific desired response from the users. By way of example and not by way of limitation, the system may request that the user move to the location of a sound or may request that the user point in the direction of a sound. In these embodiments the sound has a specific direction or location defined by the system and it is desired that the user's response physically approximate that direction. Other embodiments include requesting that the user say the location of a sound and identifying the said location using known voice recognition systems.

The system may continuously monitor the location and/or orientation of the user within the room. During or after the cue has been provided the system may monitor the user's response 703. By way of example and not by way of limitation the system may use motion detection systems such as accelerometers coupled to a controller or an image capture unit to detect the user or the location of the user's controller. Further information about detection of user location and/or orientation can be found in commonly owned U.S. Pat. No. 9,682,320 (SCEA06016US01) the contents of which are incorporated herein by reference. The system may also monitor a microphone to determine the user response. Further information about voice detection and speech recognition can be found in commonly owned U.S. Pat. No. 8,549,442 (SCEA05035US00)

After a response has been detected the system may adjust the HRTF based on the response 704. By way of example and not by way of limitation, the system may change the HRTF to better simulate the HRTF of the listener with the sound source at the simulated distance and/or change the HRTF to better simulate HRTF of the listener when the sound source is at a particular simulated angle to the listener. In some embodiments the HRTF filter may better simulate the HRTF of the listener for simulated height of the sound source.

Once the system has adjusted the HRTF, the process may be repeated to ensure an accurate simulated HRTF has been chosen. The system may continuously monitor the responses of the user or may stop repeating the process when a defined number of the user's responses are within some threshold from the desired response. By way of example and not by way of limitation the threshold may be some distance from the simulated point and/or some angle from the desired point.

Figure 4:
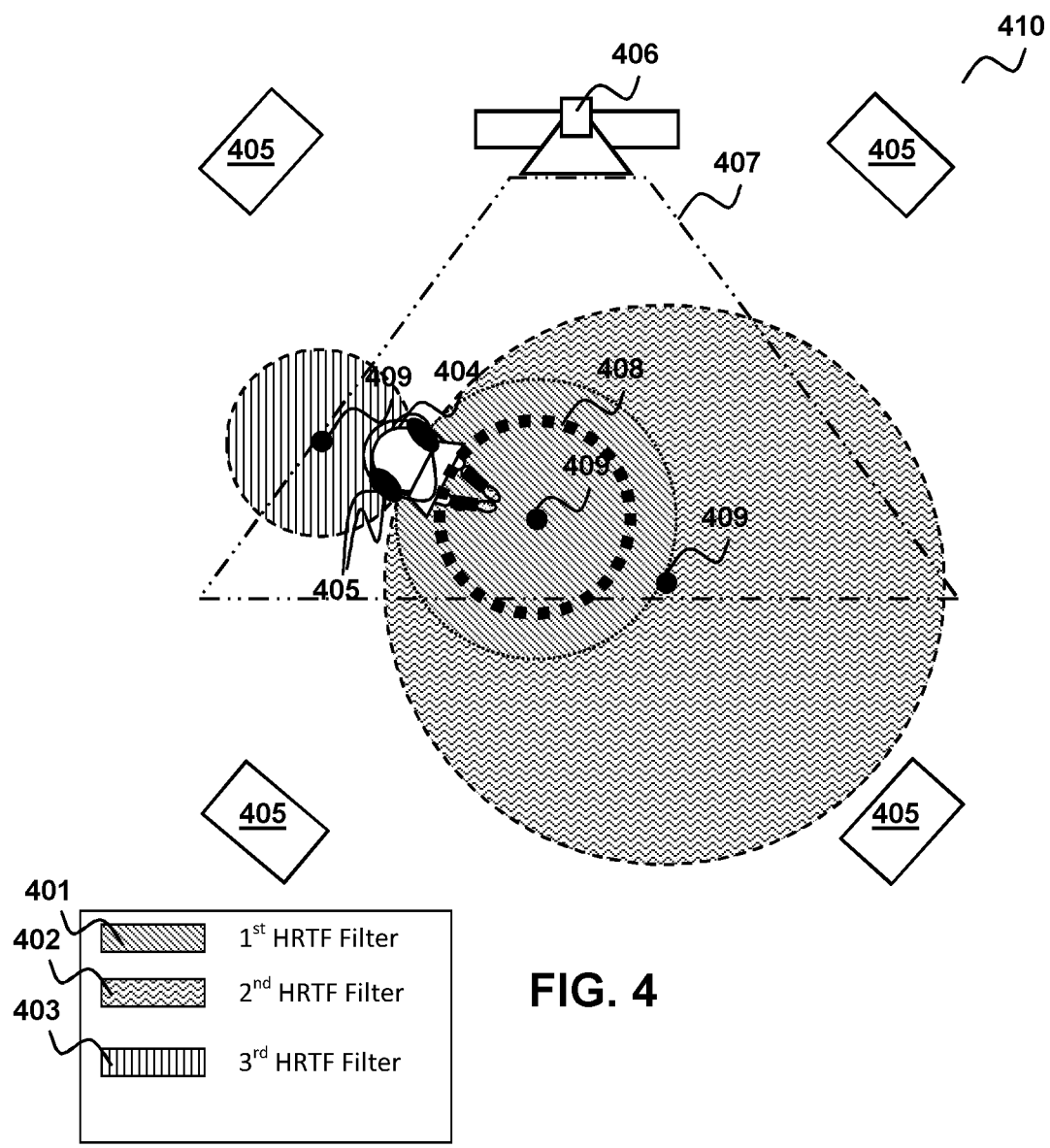
FIG. 4 is a schematic diagram of depicting a room with a sound system simulating point sources within the room with user feedback according to aspects of the present disclosure.
Figure 8:
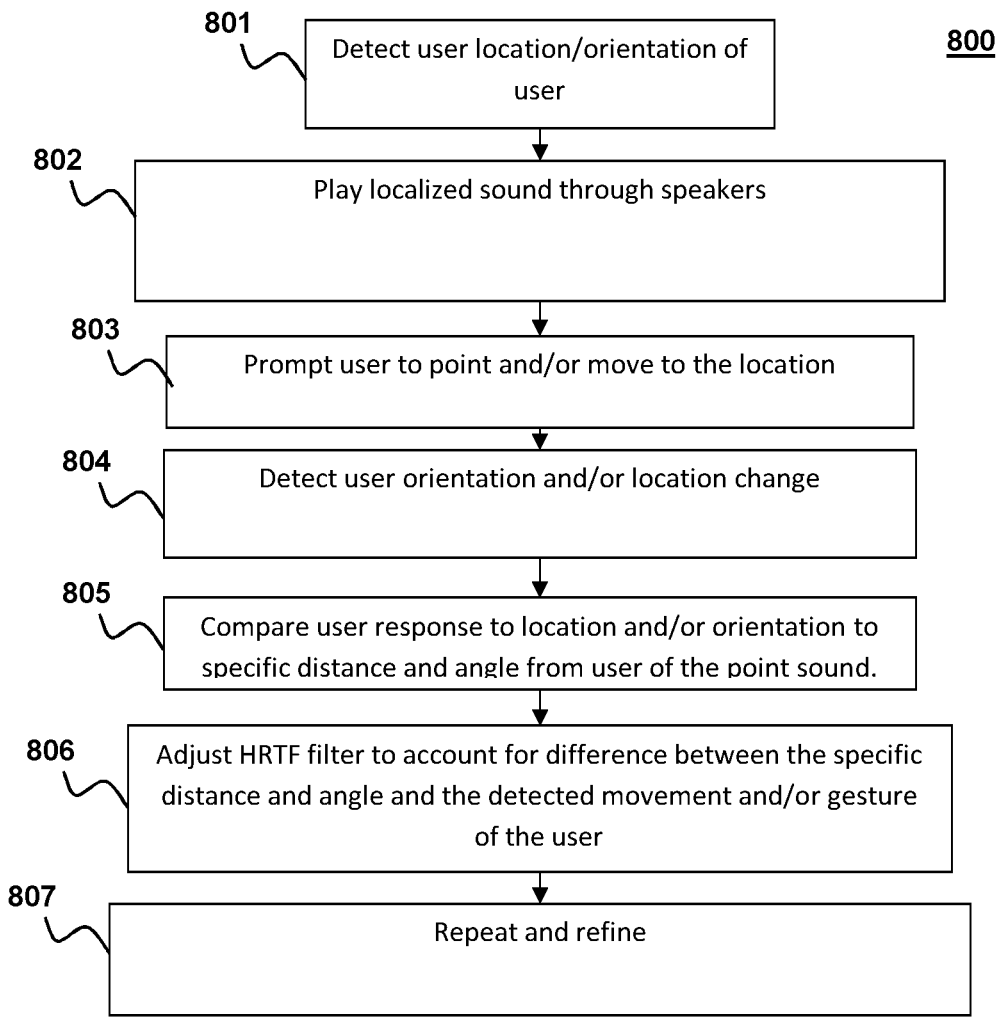
FIG. 8 is a flow diagram depicting a method for refinement of the HRTF using point sounds according to aspects of the present disclosure.

FIG. 4 and FIG. 8 depict the method of refinement of the HRTF using point sound sources 409. A user 404 may be located in a room 410 with a sound system 405 and an image capture unit 406. The sound system 405 may be configured to play point source sound cues 409 within the room, each of the point-source sound cues 409 having a defined distance and angle from the user. To provide greater fidelity for this simulated distance and angle each point-source waveform may be convolved with a specific HRTF for the listener 404. A first waveform 401 is used to drive the speakers of the sound system within the room. The waveform 401 is configured to simulate a point sound source located at a position within the room. The waveform 401 is converted to the frequency domain and convolved with the chosen HRTF of the user. This specific HRTF enables the user to better localize or externalize the simulated location of sounds generated by the sound system.

Initially the system detects the listener's original position and convolves the waveform with an HRTF chosen from a set of HRTFs based on the user's position and other user information such as head size and ear shape, as indicated at 801. The system may detect the original position of the user by such means as accelerometers coupled to a game controller, an image capture unit configured to detect a known configuration of one or more light sources coupled to a game controller, a microphone array coupled to a game controller and the like. The filtered waveform is then used to drive the sound system.

The system may prompt the user to move or point to the apparent location of the point source of sound within room as indicated at 802. The system may then drive the sound system with waveform having a specific point source location that is convolved an HRTF filter 401 for the user, as indicated at 803. The system may also move the specific point source location around the room and track the accuracy of the user's response to the movement. By way of example and not by way of limitation the system may provide instructions to the user on a screen. In an alternative embodiment the point sound includes the prompt. In another alternative embodiments the user is prompted before, during or after the point source sound is played.

The system monitors the user position and/or orientation for a change as indicated at 804. The system detects such a change using motion detection devices 406 as described above to detect the original and new orientation and/or position of the user. Additionally the orientation of the user may include gestures. The system may have features that allow for gesture detection to detect whether the user is pointing or making another type of gesture toward the simulated location of the sound. The gesture detection device may be hand held game controller or an image capture unit configured to determine the location of the user's limbs. If there is no change in the user's position after a time out period the system select the current location/ orientation of the user as the response. Otherwise the after a change in location/orientation has been made by the user the system determines the user's new location and/or orientation as the response. According to another embodiment of the present disclosure the system may also track the accuracy of the user's movement as the sound source moves.

Upon determination of the user's response the system compares the user's response to the simulated location of the point source 409, as indicated at 805. The comparison may determine whether the angle of a user's limb and/or body location in relation to the simulated angle of the sound source to the user is within a threshold. Alternatively the system may determine whether the user has moved to within a threshold distance of the simulated location of a point source sound.

Once a comparison has been made between the user's response and the simulated location of the point source sound, the system may adjust the HRTF filter in accordance with the user's response, as indicated at 806. By way of example and not by way of limitation the system may change the HRTF filter to a second HRTF 402 corresponding to a point source further from the simulated location if the system determines that user's new location 404 is not within a threshold distance of the first HRTF 408. (Note: that in the depicted example of FIG. 4, the user has not moved in response to the sound cue.) Alternatively the system may change the HRTF to a third HRTF 403 corresponding to a point source closer to the simulated location if the system determines that the user has moved passed the simulated location and the new location is not within the threshold. Once a new HRTF filter and source location has been generated the system may repeat the refinement process until the user's location and orientation is within a threshold, as indicate at 807.

As discussed above the system may store multiple predetermined HRTFs for corresponding predetermined locations and orientations of simulated point sources with respect to the user. The stored HRTF's may be used to generate an HRTF tailored to an arbitrary desired location and orientation of the point source to the user. Interpolation between the different HRTFs may be used to better simulate a distance between the set distances of each HRTF.

Figure 6:
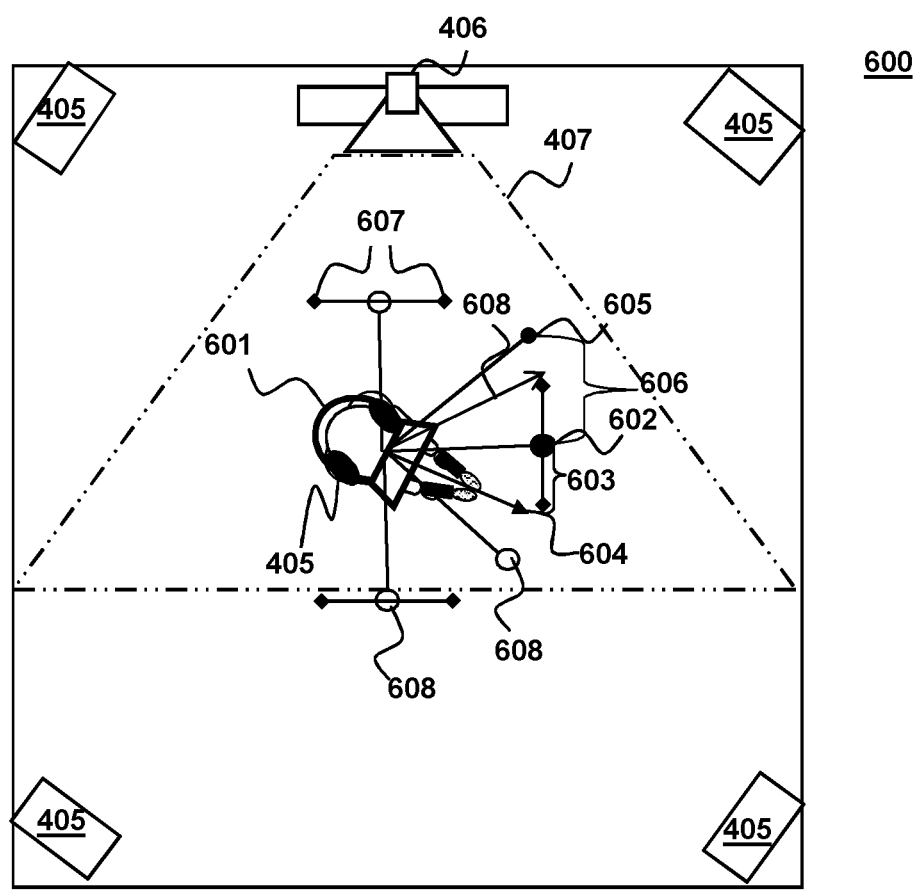
FIG. 6 is a schematic diagram showing the analysis of user response to a sound played at an angle from the user's original orientation according to aspects of the present disclosure.

In some implementations, angle comparison may determine whether the response is within an angular threshold of the angle of the simulate point source from the user's original position as may be better understood in the context of Example FIG. 6. The system 600 may store multiple HRTF filters corresponding to different angles of the HRTF of the user 608. The system 600 initially plays a simulated point source sound having a simulated location to the right of the user 602. The system uses an initial HRTF in conjunction with a speaker driver signal to play the sound. The user 601 may then respond to the source sound by turning to face apparent location of the source 604. In this example the user 601 has not turned to the completely face the source thus it can be assumed that the user did not correctly perceive the desired location of the source. The motion detection system 406 may detect the orientation of the user and the system 600 determines that the user is not within an angular threshold 607 for the desired location of the source 602. If the user's response is not within the angular threshold 607 the system may use the locational detection systems to determine the difference between the user's response angle and the direct toward the desired simulated location of the point sound 603. The system may take this difference and simply add or subtract this amount to the angle of the simulated source angle depending on which side of the response the simulated point source is located to generate an offset point source. The system may then choose an HRTF corresponding to an angle 605 nearest to the resulting offset angle 608 and use that filter 605 for the next point source sound. Alternatively the system may simply generate a new HRTF using the degree of error in the function. In some embodiments the interpolation between the two nearest HRTF 606 filters may be used to generate an HRTF corresponding to an offset point source between angles of the custom generated HRTF.

In determining the degree of error between user response and the ideal response the system may isolate each variable. For example, the system may first determine the degree of error in the angle of the user's response and then determine the distance degree of error without regard to the orientation of the user. After both the angular and directional offset are resolved the system may run the method again and determine whether the response is within the thresholds. The system may repeat the procedure until the responses fall within the threshold. The system may also perform a final test to determine whether an accurate HRTF has been chosen. By way of Example and not by way of limitation the system may play a panned sound across the front of the user and prompt the user to follow the sound with their hand exactly.

Figure 5:
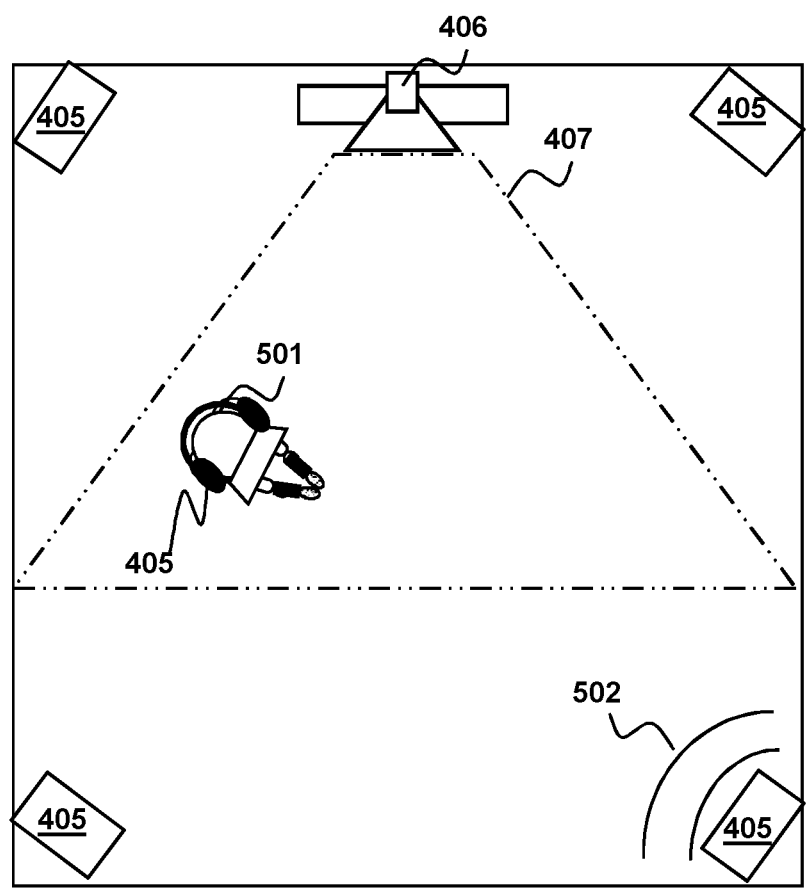
FIG. 5 is a schematic diagram depicting a sound system simulating panning sounds around a user with user feedback according to aspects of the present disclosure.
Figure 7B:
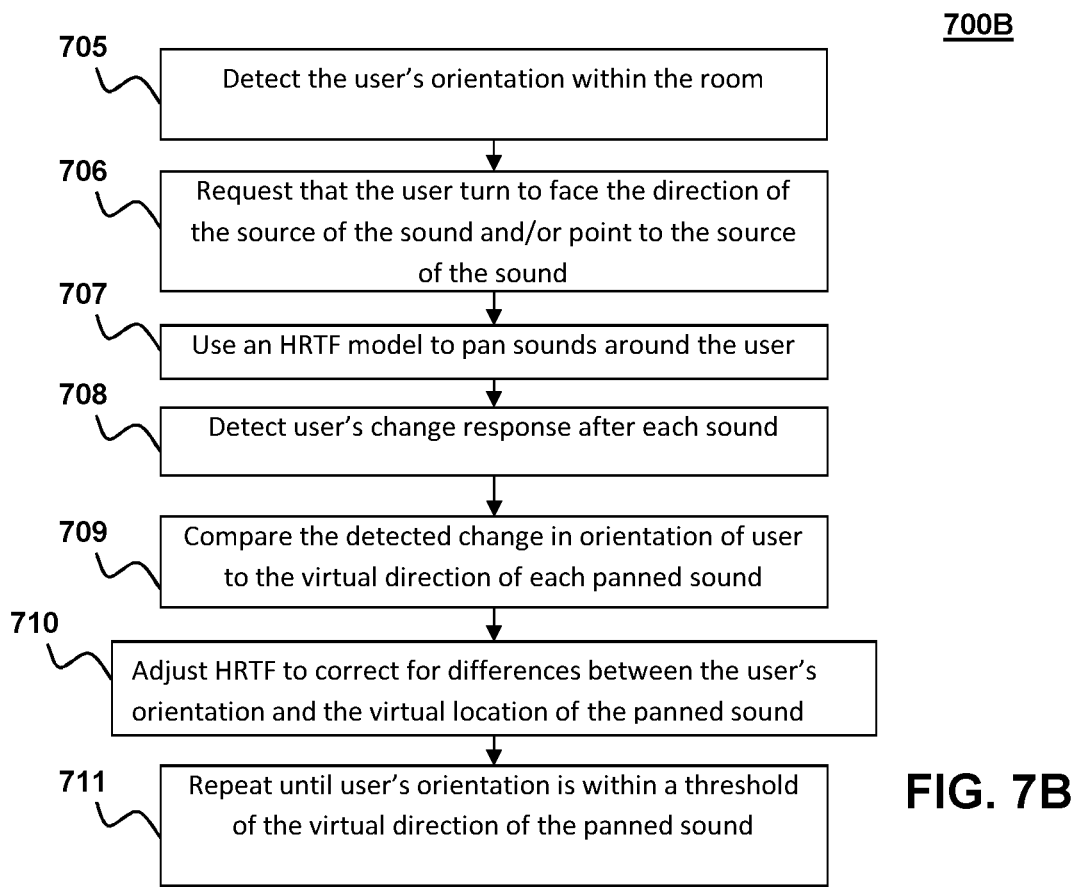
FIG. 7B is a flow diagram depicting disclosure method for refinement of the HRTF with Panned sounds and user feedback according to aspects of the present disclosure.

In an alternative embodiment described in FIGS. 5 and 7B the system may determine the angular offset for the HRTF through use of panned sounds. Initially the system may detect the user's orientation within the room via motion detection 406 device as described above, as indicated at 705. The system may prompt the user 501 to face the sound source or point toward the sound source 502, as indicated at 706. The system may then pan the sound source around the user using a different HRTF filter for each angle 707. Each time the angle of the sound source is changed in relation to the user's position the system determines a change in the orientation of the user, as indicated at 708. Once a change in the orientation of the user is detected the system determines the user's final orientation to be the user's response. As discussed above the system may determine the degree of error between the simulated angle of the source sound and the user' response and from that error generate an offset, as indicated at 709. The offset may then be added to or subtracted from the angle of simulated source before determining the HRTF using the offset simulated source angle as indicated at 710. According to aspects of the present disclosure the system may improve the localization of simulated sound sources within the sound system using panned sound sources initially instead of point locations. This initial step may improve the speed and accuracy of offset determination because locational information is not provided to the user and therefore is not present to confuse the user during HRTF determination.

As discussed above the refinement of the HRTF may continue until the user's response to the panned sounds is within the threshold angle of the simulated sound source, as indicated at 711.

Head Response Transfer Function Filtering

Figure 9:
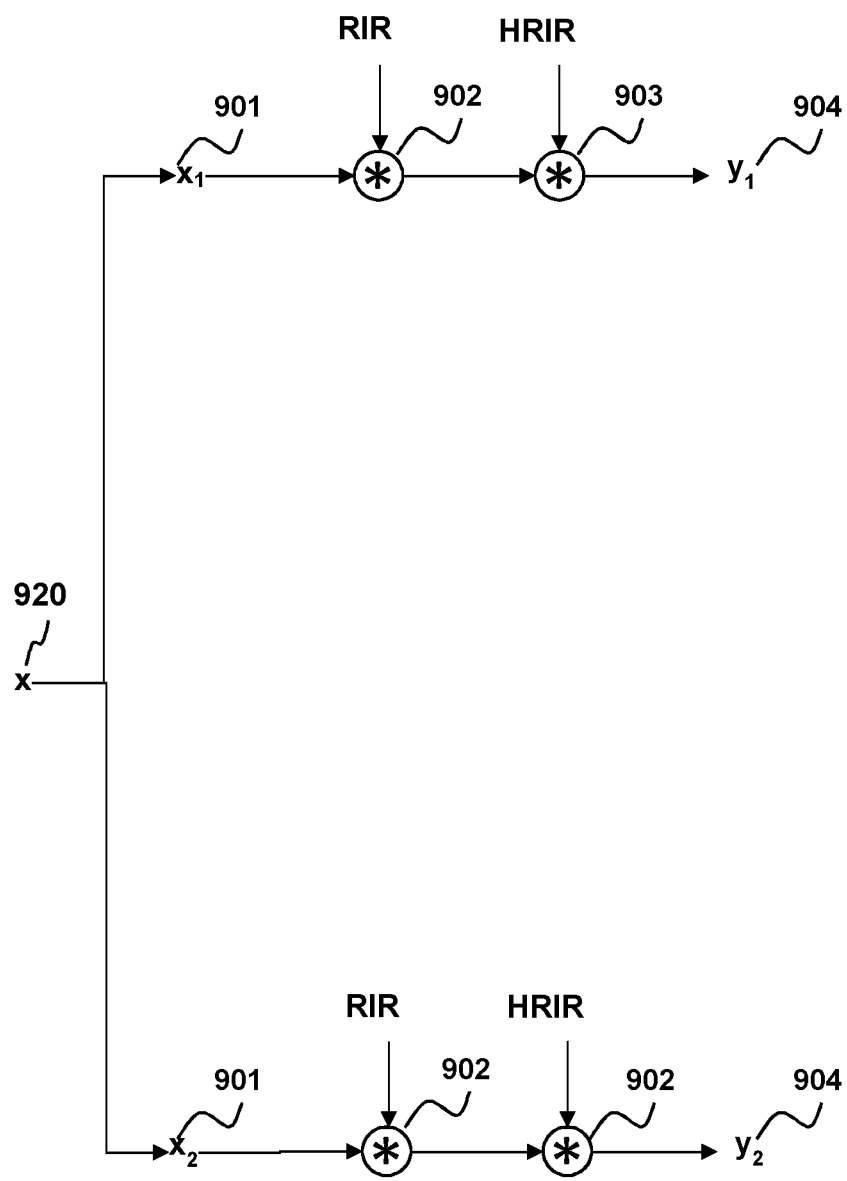
FIG. 9 is a schematic diagram depicting the filtering and processing a multi-channel audio signal with the HRTF according to aspects of the present disclosure.

FIG. 9 depicts a filtering system for a three channel sound system with locational effects. The system may have a source waveform 920. The source waveform 920 may be composed many separate channels 901. Here the source waveform comprises two different channels, $X_1$, $X_2$. These source channel signals may each initially be composed discrete time and amplitude samples. To perform convolutional filtering theses source channels may be transformed in to the time-invariant frequency domain with the use of well know transformation functions such as a Discrete Fourier transform (DFT) or Discrete Cosine transform (DFT). Once the source channel signals have been transformed to the frequency domain they may be convolved through multiplication 902 with many different filter functions representing different desired sound effects. By way of example and not by way of limitation one such filter may be a filter that provides an optimal room impulse response to the user aspects of which are described in more detail in commonly owned co-pending application Ser. No. 15/890,007, attorney reference SCEA17067US00 the contents of which are incorporated by reference herein. After the HRTF for the user has been determined from the methods discussed above it may be multiplicatively convolved 903 at each frequency with the source channel. It should be noted that each source channel will have a different HRTF filter.

After the HRTF for the user is convolved with the channel signal, the channel may be transformed back to the time domain using well known transformation functions such as Inverse Discrete Fourier Transform (IDFT) and Inverse Discrete Cosine Transform (IDCT). To generate the Filtered time domain channel signals 904, $y_1$, $y_2$. These Filtered time domain signals may then be used to drive speakers within a sound system.

Figure 11:
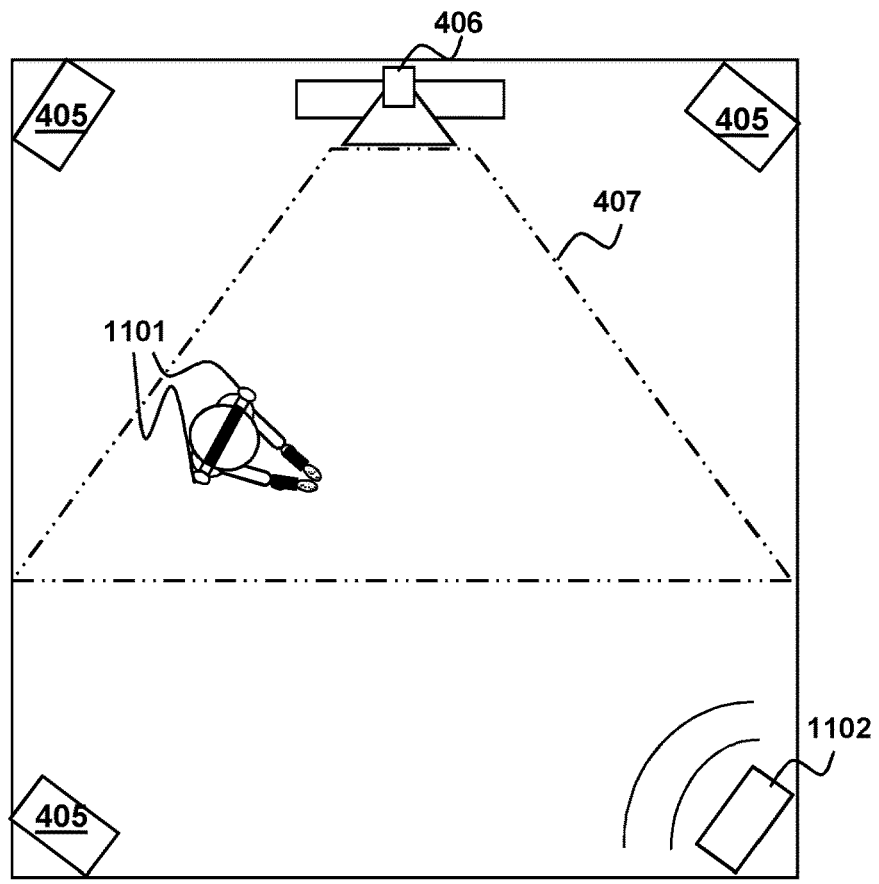
FIG. 11 shows a user generating a custom HRTF with microphones coupled to the user's ears according to aspects of the present disclosure.
Figure 12:
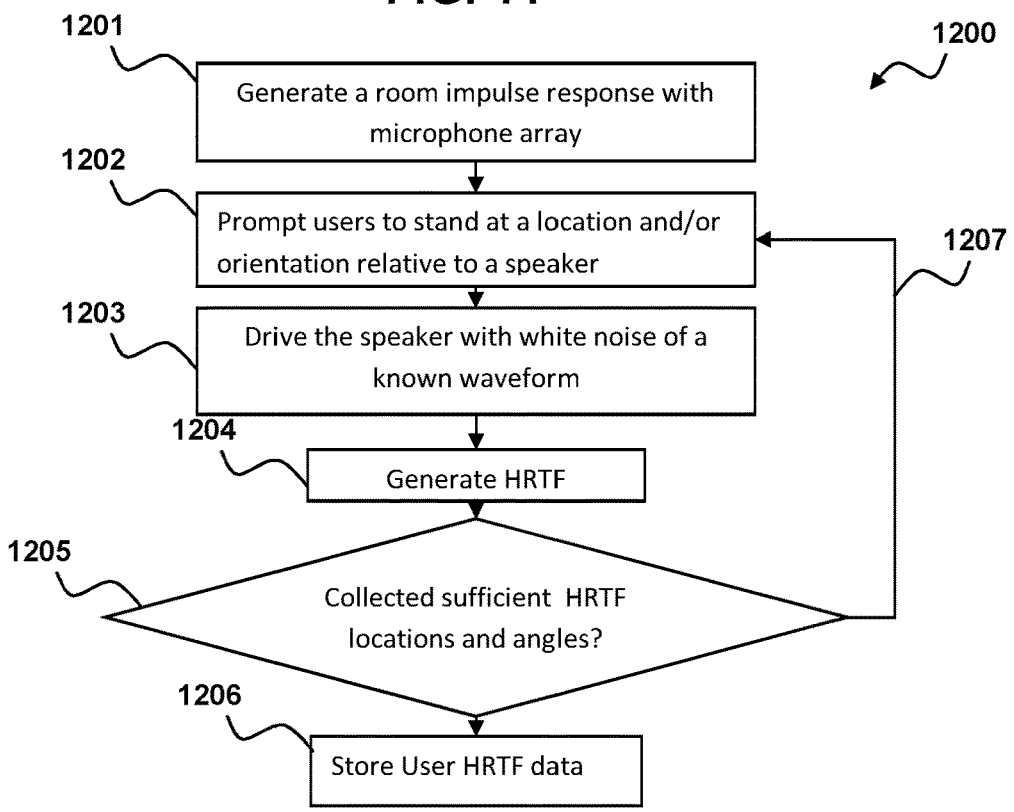
FIG. 12 depicts a flow diagram for the method of generation of a customized HRTF for the user according to aspects of the present disclosure.

According to an alternative embodiment of the present disclosure a customized HRTF may be determined for the user as depicted in FIGS. 11 and 12. Initially a room impulse response function may be determined for the sound system, as indicated at 1201. Such a room impulse response may be determined by placing a microphone array in the middle of the room and playing a known waveform through the speakers. Further information about determination of the room impulse response can be found in commonly owned co-pending application Ser. No. 15/890,007, (SCEA17067US00).

Figure 13:
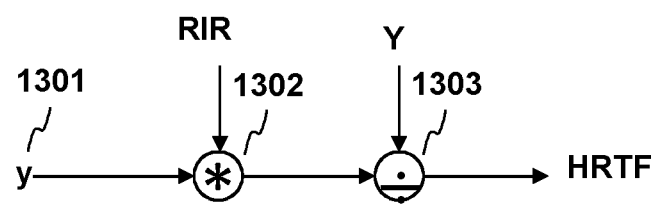
FIG. 13 shows a schematic diagram of a system of filtering to generate a customized HRTF for the user according to aspects of the present disclosure.

Once the room impulse response is determined, the user's HRTF may be generated utilizing two microphones, one coupled to each ear of the user 1101. The sound system may drive a speaker 1102 for a single channel with a broadband signal, as indicated at 1202. The system may prompt the user to move to several distances from the speaker and face certain directions, as indicated at 1203. The system may monitor the user's location and/or with motion detection devices 406 as discussed above. To create the optimal HRTF the system may provide the user with feedback information about the correct location and orientation during the method. The system may pause data collection until it has determined that the user is in the correct location and/or orientation. The speaker 1102 will emit a broadband sound signal which is picked up by the two microphones 1101. The HRTF for the user at that position will then be generated 1204 as seen in FIG. 13. The two microphones will then transduce the sound waves to electrical signals which will be converted in to sampled time domain signals by the system. The sampled time domain signals may then be converted to time invariant frequency domain signals, as indicated at 1301 through the use of such transformations as DFT or DCT. The frequency domain signal may then be de-convolved from the transformed room impulse response through complex division at each frequency, as indicated 1302. To generate the HRTF the signal may then be de-convolved from the original sound wave form by complex division, as indicated at 1303. Once the User's HRTF has been determined at different distances and angles from the sound source it may be stored in the memory of the system or uploaded to a cloud storage system. The system may check if it has generated enough HRTF's for its applications, as indicated at 1205. If the system has not collected enough HRTF samples it will repeat 1207. If the system has generated enough HRTF samples it will store them for later as discussed above 1206. The generated HRTF's may be used to better to localize sounds that are optimized for individually the user according to the methods discussed above.

Figure 14:
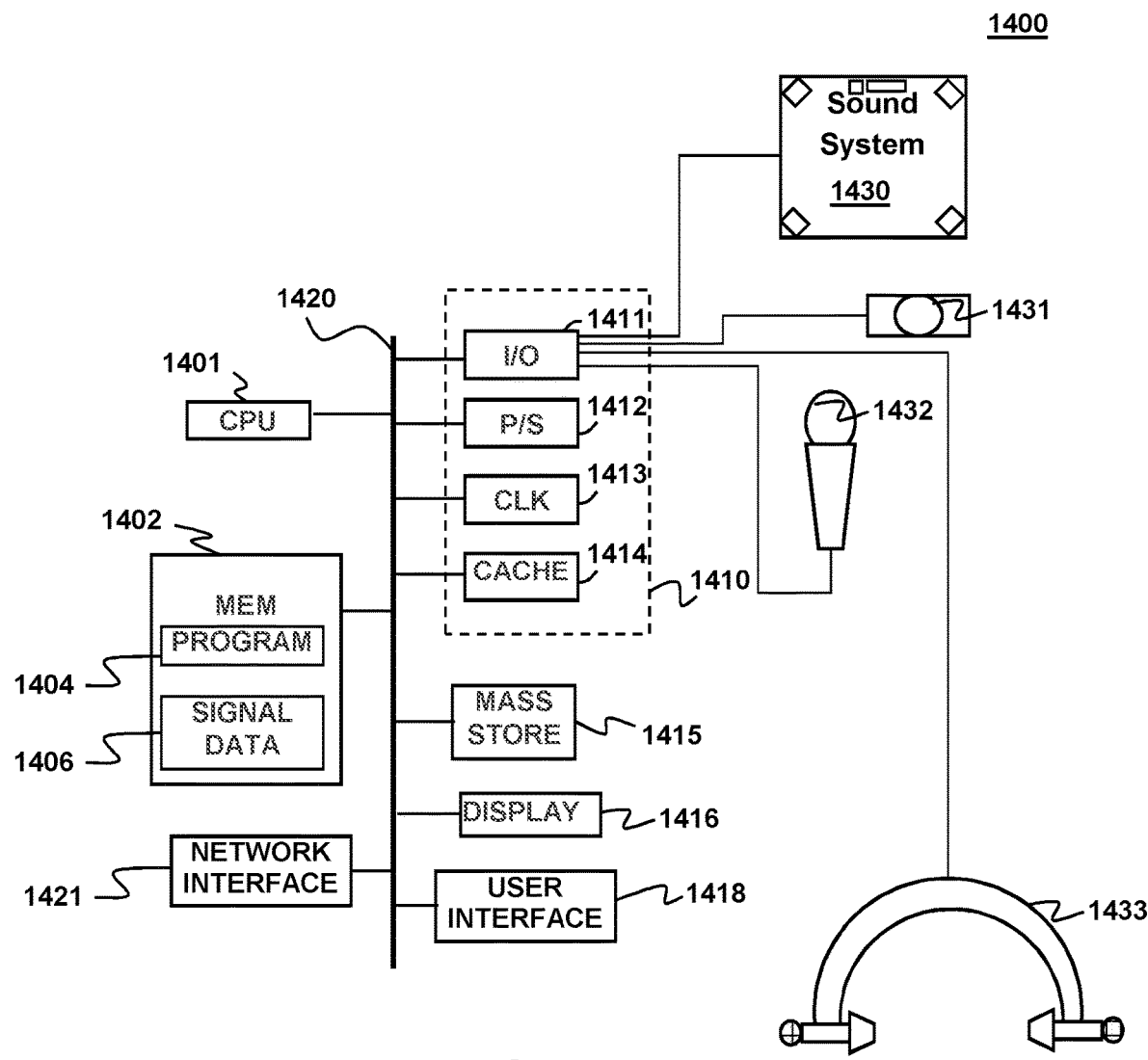
FIG. 14 is a block diagram depicting a system configured to simulate process audio signals to illustrate various aspects of the present disclosure.

Turning to FIG. 14, a block diagram of an example system 1400 configured to localize sounds in accordance with aspects of the present disclosure.

The example system 1400 may include computing components which are coupled to a sound system output 1430 in order to process and/or output audio signals in accordance with aspects of the present disclosure. By way of example, and not by way of limitation, in some implementations the sound system comprises a stereo headset, in other implementation the sound system comprises multichannel headphones. Furthermore, in some implementations, the system 1400 may be part of an embedded system, mobile phone, personal computer, tablet computer, portable game device, workstation, game console, portable headset and the like.

The system 1400 may be configured to process audio signal to convolve impulse response filters in accordance with aspects of the present disclosure. The system 1400 may include one or more processor units 1401, which may be configured according to well-known architectures, such as, e.g., single-core, dual-core, quad-core, multi-core, processor-coprocessor, and the like. The system 1400 may also include one or more memory units 1402 (e.g., RAM, DRAM, ROM, and the like).

The processor unit 1401 may execute one or more programs, portions of which may be stored in the memory 1402, and the processor 1401 may be operatively coupled to the memory 1402, e.g., by accessing the memory via a data bus 1420. The programs may be configured to process source audio signal, e.g. for converting the signals to surround sound signals for later user, or output to the speakers 1430. By way of example, and not by way of limitation, the programs may include programs 1404, execution of which may cause the system 1400 to perform a method having one or more features in common with the example methods above, such as method 700A of FIG. 7A or method 700B of FIG. 7B or method 800 of FIG. 8 and/or method 1200 of FIG. 12. By way of example, and not by way of limitation, the programs 1404 may include processor executable instructions which cause the system 1400 to filter one or more channels of a source signal 1406 with one or more filters representing one or more impulse responses to virtualize locations of the sources of sounds in an output audio signal. The memory 1402 may also contain signal data 1406 which may include a source signal waveform used to drive the speakers, Head related transfer function signals, room impulse response signal and HRTF filter signals.

The system 1400 may also include well-known support circuits 1410, such as input/output (I/O) circuits 1411, power supplies (P/S) 1412, a clock (CLK) 1413, and cache 1414, which may communicate with other components of the system, e.g., via the bus 1420. The system 1400 may also include a mass storage device 1415 such as a disk drive, CD-ROM drive, tape drive, flash memory, or the like, and the mass storage device 1415 may store programs and/or data. The system 1400 may also include a user interface 1418 to facilitate interaction between the system 1000 and a user. The user interface 1416 may include a keyboard, mouse, light pen, game control pad, touch interface, or other device. The system may also include a display 1416 to provide visual information to the user. The system 1400 may also execute one or more general computer applications (not pictured), such as a video game, which may incorporate aspects of virtual surround sound as computed by the convolution programs 1404. Additionally coupled to the I/O port may be any number of motion detection devices such as an image capture unit 1431, Motion detecting controllers 1432, and Microphone arrays 1433. The image capture unit may be a video recorder, still camera, infrared camera and the like. The motion detecting controllers may use any type of motion control known in the art such as accelerometers coupled to the controller, a microphone array coupled to the controller or displacement sensors coupled to the controller. The motion detecting controller may work in tandem the image capture unit to provide greater resolution to the motion detection process. The microphone array 1433 may be coupled to the ears of the user and used to carry out the method 1200 of FIG. 12. The microphones in the array may be of any type but are preferably omni-directional microphones.

The system 1400 may include a network interface 1421, configured to enable the use of Wi-Fi, an Ethernet port, or other communication methods. The network interface 1421 may incorporate suitable hardware, software, firmware or some combination thereof to facilitate communication via a telecommunications network. The network interface 1421 may be configured to implement wired or wireless communication over local area networks and wide area networks such as the Internet. The system 1400 may send and receive data and/or requests for files via one or more data packets over a network.

It will readily be appreciated that many variations on the components depicted in FIG. 14 are possible, and that various ones of these components may be implemented in hardware, software, firmware, or some combination thereof. For example, the some features or all features of the convolution programs contained in the memory 1402 and executed by the processor 1401 may be implemented via suitably configured hardware, such as one or more application specific integrated circuits (ASIC) or a field programmable gate array (FPGA) configured to perform some or all aspects of example processing techniques described herein.

CONCLUSION

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for determining an optimal Head-Related Transfer Function the method comprising;
    a) determining a location of a user and a defined Head-Related Transfer Function (HRTF) for the user, wherein the user is provided images of heads associated with different HRTFs and the user is prompted to choose an image of a head that closely matches their own;
    b) driving a speaker with a waveform representing a location specific cue having a desired user response wherein the location specific cue is associated with the defined HRTF for the determined location of the user, wherein the location specific cue is a panned sound source and the desired user response is a change in orientation of the user towards a virtual location of the panned sound source;
    c) detecting a user response to location specific cue;
    d) analyzing user response in comparison to location specific cue; and
    e) updating the defined HRTF with information from the comparison of the user response and the location specific cue.

2. The method of claim 1 further comprising repeating steps a) through e) until the detected user response matches the desired user response.

3. The method of claim 1 wherein a) further comprises determining an inter-aural distance of the user.

4. The method of claim 3 wherein the defined head-related transfer function of b) is chosen at least based on the determined inter-aural distance of the user.

5. The method of claim 3 wherein the inter-aural distance is determined from user input.

6. The method of claim 3 wherein the inter-aural distance is determined from an image of the user's face captured by an image capture unit.

7. The method of claim 3 wherein the inter-aural distance is determined from a photograph of the user.

8. The method of claim 1 wherein a) further comprises determining an ear shape and/or size of the user.

9. The method of claim 8 wherein the ear shape and/or size is determined from an image of the user's ear captured by the image capture unit.

10. The method of claim 1 wherein the change in orientation of the user includes pointing at the virtual location of the sound source.

11. The method of claim 1 wherein determining a location of a user at a) further comprises playing white noise out of a single speaker while the user is wearing microphones in the user's ear's to track the user's movements and head orientation.

12. A non-transitory computer readable medium having embodied thereon instructions, the instructions when executed by a processor cause the processor to carry out the method for determining an optimal Head-Related Transfer Function the method comprising:
 a) determining a location of a user and a defined Head-Related Transfer Function (HRTF) for the user, wherein the user is provided images of heads associated with different HRTFs and the user is prompted to choose an image of a head that closely matches their own;
 b) play a location specific cue having a desired user response wherein the location specific cue is associated with the defined HRTF for the determined location of the user, wherein location specific cue is a panned sound source and the desired user response is a change in orientation of the user towards a virtual location of the panned sound source;
 c) detect a user response to location specific cue;
 d) analyze user response in comparison to location specific cue; and
 e) update the defined HRTF with information from the comparison of the user response and the location specific cue.

13. The method of claim 12 further comprising repeating steps a) through e) until the detected user response matches the desired user response.

14. The method of claim 12 wherein a) further comprises determining an inter-aural distance of the user.

15. The method of claim 14 wherein the defined head-related transfer function of b) is chosen at least based on the determined inter-aural distance of the user.

16. The method of claim 12 wherein a) further comprises determining an ear shape and/or size of the user.

17. The method of claim 16, wherein the defined head-related transfer function of b) is chosen at least based on the determined ear shape and/or size of the user.

18. A system, comprising:
 a processor,
 a memory coupled to the processor, the memory having executable instructions embodied therein, the instructions being configured to cause the processor to carry out a method when executed, the method comprising;
 a) determining a location of a user and a defined Head-Related Transfer Function (HRTF) for the user, wherein the user is provided images of heads associated with different HRTFs and the user is prompted to choose an image of a head that closely matches their own;
 b) play a location specific cue having a desired user response wherein the location specific cue is associated with the defined HRTF for the determined location of the, wherein location specific cue is a panned sound source and the desired user response is a change in orientation of the user towards a virtual location of the panned sound source;
 c) detect a user response to location specific cue;
 d) analyze user response in comparison to location specific cue; and
 e) update the defined HRTF with information from the comparison of the user response and the location specific cue.

* * * * *